(12) United States Patent  (10) Patent No.: US 8,135,814 B2
Armanino et al.  (45) Date of Patent: Mar. 13, 2012

(54) NETWORK CAPACITY MANAGEMENT SYSTEM

(75) Inventors: Frederick Armanino, San Antonio, TX (US); Anthony Wayne Merritt, Brentwood, CA (US); Peter A. Wong, Newark, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 898 days.

(21) Appl. No.: 11/172,206

(22) Filed: Jun. 29, 2005

(65) Prior Publication Data

US 2007/0005648 A1    Jan. 4, 2007

(51) Int. Cl.
 *G06F 15/173* (2006.01)
(52) U.S. Cl. ......... 709/223; 709/224; 709/225; 709/226
(58) Field of Classification Search ................... 709/223
 See application file for complete search history.

(56) References Cited

U.S. PATENT DOCUMENTS

| | | | | |
|---|---|---|---|---|
| 6,219,704 B1 * | 4/2001 | Kim et al. | ...................... | 709/224 |
| 6,731,600 B1 * | 5/2004 | Patel et al. | ...................... | 370/230 |
| 6,735,598 B1 | 5/2004 | Srivastava | | |
| 6,745,011 B1 * | 6/2004 | Hendrickson et al. | ..... | 455/67.11 |
| 6,804,457 B1 * | 10/2004 | Miyashita et al. | ............ | 386/109 |
| 6,959,306 B2 * | 10/2005 | Nwabueze | ................. | 707/104.1 |
| 7,099,944 B1 * | 8/2006 | Anschutz et al. | ............. | 709/227 |
| 7,127,518 B2 * | 10/2006 | Vange et al. | ................ | 709/230 |
| 7,237,023 B2 * | 6/2007 | Menard et al. | ................ | 709/224 |
| 7,587,485 B1 * | 9/2009 | Chitnis et al. | ................. | 709/224 |
| 7,636,917 B2 * | 12/2009 | Darling et al. | ................ | 718/105 |
| 2003/0055835 A1 * | 3/2003 | Roth | ............................ | 707/102 |
| 2003/0210656 A1 * | 11/2003 | Biacs et al. | ................... | 370/252 |
| 2003/0212660 A1 * | 11/2003 | Kerwin | ........................... | 707/1 |
| 2004/0177156 A1 * | 9/2004 | Hahn et al. | .................... | 709/240 |
| 2005/0182852 A1 * | 8/2005 | Tinsley et al. | ............... | 709/238 |
| 2006/0084429 A1 * | 4/2006 | Buvaneswari et al. | ....... | 455/424 |
| 2007/0220170 A1 * | 9/2007 | Abjanic et al. | ............... | 709/246 |
| 2007/0239873 A1 * | 10/2007 | Farhat et al. | .................. | 709/224 |
| 2007/0255829 A1 * | 11/2007 | Pecus et al. | ................... | 709/225 |

* cited by examiner

*Primary Examiner* — Jeffrey Pwu
*Assistant Examiner* — Shaq Taha
(74) *Attorney, Agent, or Firm* — Jackson Walker L.L.P.

(57) ABSTRACT

The present invention discusses a computerized method for managing a communication network through processing data used in a Capacity Management System (CMS) associated with the communication network. A configurable grammar, such as an XML grammar with regular expressions, is used to implement various aspects of network management. Data management includes pre-processing data (transferring data, decompressing data, parsing data), loading data into a relational database, and data analysis. Results of data analysis can be used to determine a network condition, and thereby to enable network management.

15 Claims, 6 Drawing Sheets

```
<?xml version="1.0" encoding="UTF-8"?>
<!DOCTYPE manager SYSTEM "http://wbcm.sbc.com/public/loader.dtd">

<manager thread="10">

<database oracle_home="C:\oracle\ora81" user="ss7cms" password="ss7cms" sid="wbcmdev.nse.sbc.com"/>

<loader name="LCNT_CSN_CPU_STATS"
        class="sbc.cms.loader.LoaderOracleSQLLoader"
        delete_after_load="no"
        file_type="dat"
        method="append"
        partition="yes"
        partition_field="MEAS_DT_TIME"
        region="yes"
        silent="feedback">
        <field name="CSN_HOST"/>
        <field name="CPU"/>
        <field name="MEAS_DT_TIME" format="DATE 'MM/DD/YYYY,HH24:MI'"/>
        <field name="MEAS_LGTH"/>
        <field name="CPU_UTIL_USER"/>
        <field name="CPU_UTIL_SYS"/>
        <field name="CPU_UTIL_WAIT_BLOCK_IO"/>
        <field name="CPU_UTIL_IDLE"/>
        <field name="PEAK_PAGE_FAULTS"/>
        <field name="AVG_PAGE_FAULTS"/>
    </loader>

</manager>
```

FIG. 5

NETWORK CAPACITY MANAGEMENT SYSTEM

BACKGROUND OF THE INVENTION

1. Field of the Invention

The present invention relates to network management. In particular, the present invention relates to managing network capacity in a capacity management system.

2. Description of the Related Art

Broadband communication networks generally comprise large numbers of network elements, which in turn produce and track large quantities of data. Companies that operate these communication networks generally perform calculations on these data for various purposes, such as to optimize the use of resources. Capacity Management Systems (CMS) are used to plan, analyze, size, and optimize network capacity. A typical CMS processes vast amounts of data that are collected from a variety of sources. The process of capacity management generally comprises several stages, including obtaining data from network elements, parsing the data, loading the data into a relational database, and performing data analysis. Generally, a file clean-up stage is also involved. The process of capacity management is ideally proactive and responsive to business needs.

Applications currently used in CMS often rely on propriety configuration and hard coding of formatting "rules" to complete a task. In addition, available applications tend to focus only on a single aspect of data management (i.e. data loading only, data parsing only, etc.) rather then on creating end-to-end solutions. Oracle Corporation's SQL Loader is an example of an available application that handles only one aspect of data management, e.g. loading data into a database. As a result, developers generally have to design and develop complex parsers and data base loaders for each individual data source for a given set of network elements. This individual development can cause a great deal of duplicate functional coding efforts in support of different CMS applications. In addition, such a process is time-consuming. There is a need for an improved end-to-end solution for data management within a capacity management system.

SUMMARY OF THE INVENTION

The present invention provides a computerized method for managing a communication network. Managing the communication network generally comprises processing data used in a Capacity Management System (CMS) associated with the communication network, wherein data is typically originally located at various network elements, such as, for example, a DSLAM (Digital Subscriber Loop Access Multiplexer), or an ATM (Asynchronous Transfer Mode) switch, etc. A configurable grammar is used to implement different aspects of network management, including pre-processing data, loading data into a relational database, and data analysis. A typical configurable grammar is an XML grammar, which can be used with regular expressions. Pre-processing data typically includes transferring data from the network elements to a working directory, decompressing compressed files, extracting archived files, and parsing data. Parsing data includes assembling data selected from a set of files into another set of files (typically delimited files), enhancing data, merging data, and establishing relations between data (for using in a relational database). Loading data includes loading data (generally parsed data) into tables of a relational database (maintaining relations established while parsing). Data analysis can be used to determine a network condition, among other things, and includes normalization of data and summarizing data for high-level presentation. A post-processing cleanup can be implemented, which includes deletion of temporary files. Data analysis enables the CMS to address the network condition, such as a current condition of a network element or a forecast condition of a network element. An action can then be taken with respect to the network condition. For example, high traffic conditions at a given network element can be addressed by loading balancing or traffic routing. The use of load balancing and/or traffic routing addresses the condition without the need of expenses for new equipment. Trends can also be analyzed to forecast necessary network reconfiguration, routing, and equipment upgrades to alleviate high traffic conditions before network performance is affected.

BRIEF DESCRIPTION OF THE DRAWINGS

For a detailed understanding of the present invention, references should be made to the following detailed description of an exemplary embodiment, taken in conjunction with the accompanying drawings, in which like elements have been given like numerals.

FIG. 5 illustrates an exemplary implementation of XML grammar related to loading data into a relational database.

DETAILED DESCRIPTION OF THE INVENTION

In view of the above, the present invention through one or more of its various aspects and/or embodiments is presented to provide one or more advantages, such as those noted below.

Figure 1:
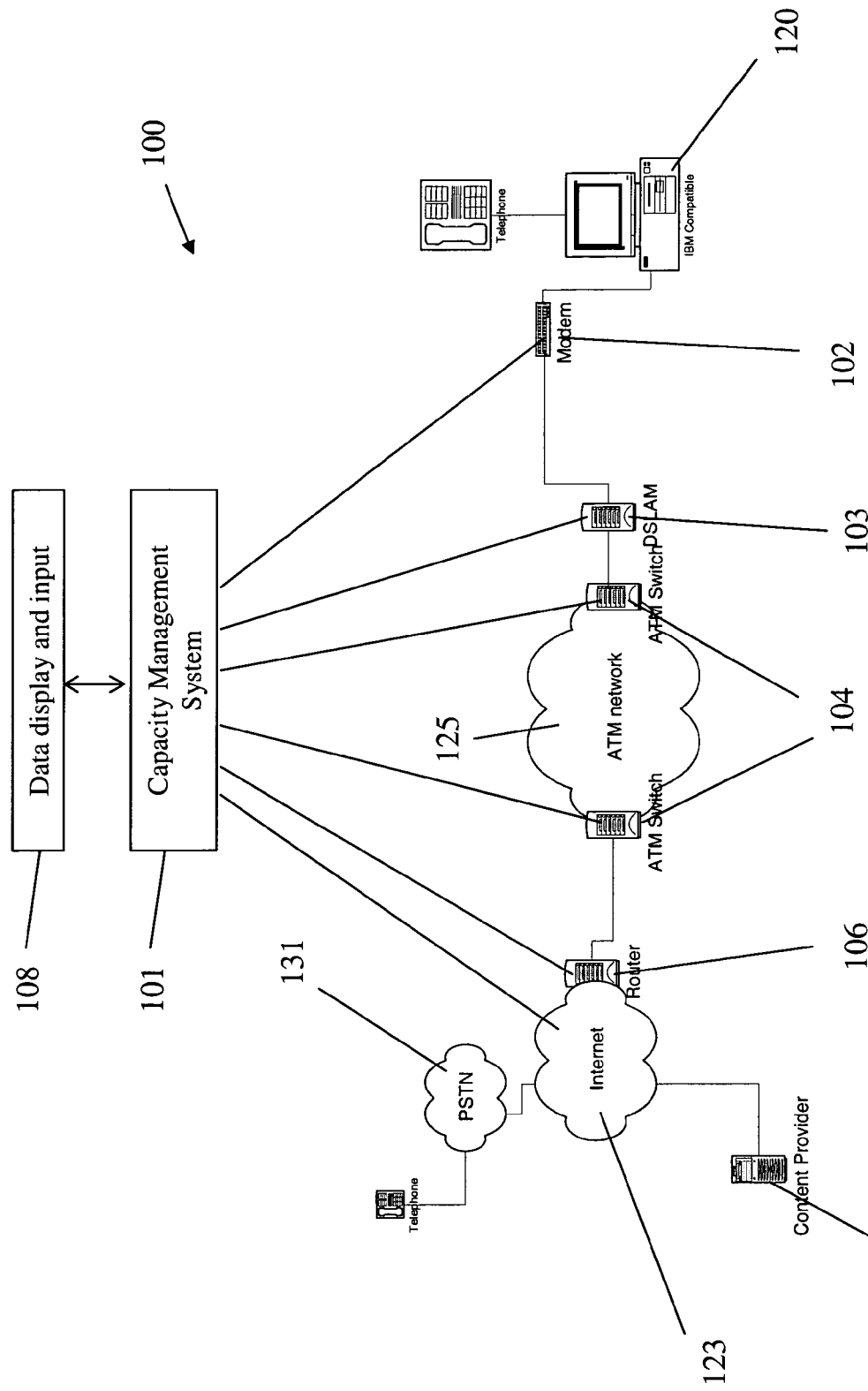
FIG. 1 illustrates a capacity management system in relation to an exemplary broadband network.

FIG. 1 shows an exemplary broadband network 100 for purposes of illustration of the present invention. The network 100 comprises a modem 102 processor and memory 101, a DSLAM (Digital Subscriber Line Access Multiplexer) 103, ATM (Asynchronous Transfer Mode) switches 104, a router 106 for providing connectivity between a content provider computer 113 and Customer Premises Equipment (CPE) 120 such as a personal computer (PC). Capacity Management System 101 runs a processor 107, such as a Sun Solaris, which includes a memory and a display terminal 108 for interaction with an operator, such as a software developer. A DSLAM is a mechanism at a phone company's central location that links many customer DSL connections to a single high-speed ATM line. When the phone company receives a DSL signal, an ADSL modem with a plain old telephone service (POTS) splitter detects voice calls and data.

Data is sent over the network 100 from a content provider computer 113 to a CPE 120 by passing through Internet 123, router 106, various ATM switches 104 (which transfer data over an ATM network 125), DSLAM 103 and modem 102. Data transfer can occur in the opposite direction as well. Voice calls are sent to the public switched telephone system (PSTN) 131. The DSLAM records ATM cell counts for each line and stores them in memory. Network data can be acquired by the present invention running in processor 101. Data is collected from various network elements, such as the DSLAM, the ATM switch, the router, the modem, etc. The number of data acquisition points shown in FIG. 1 is illustrative only, and data can be taken from any number of data points.

Figure 2:
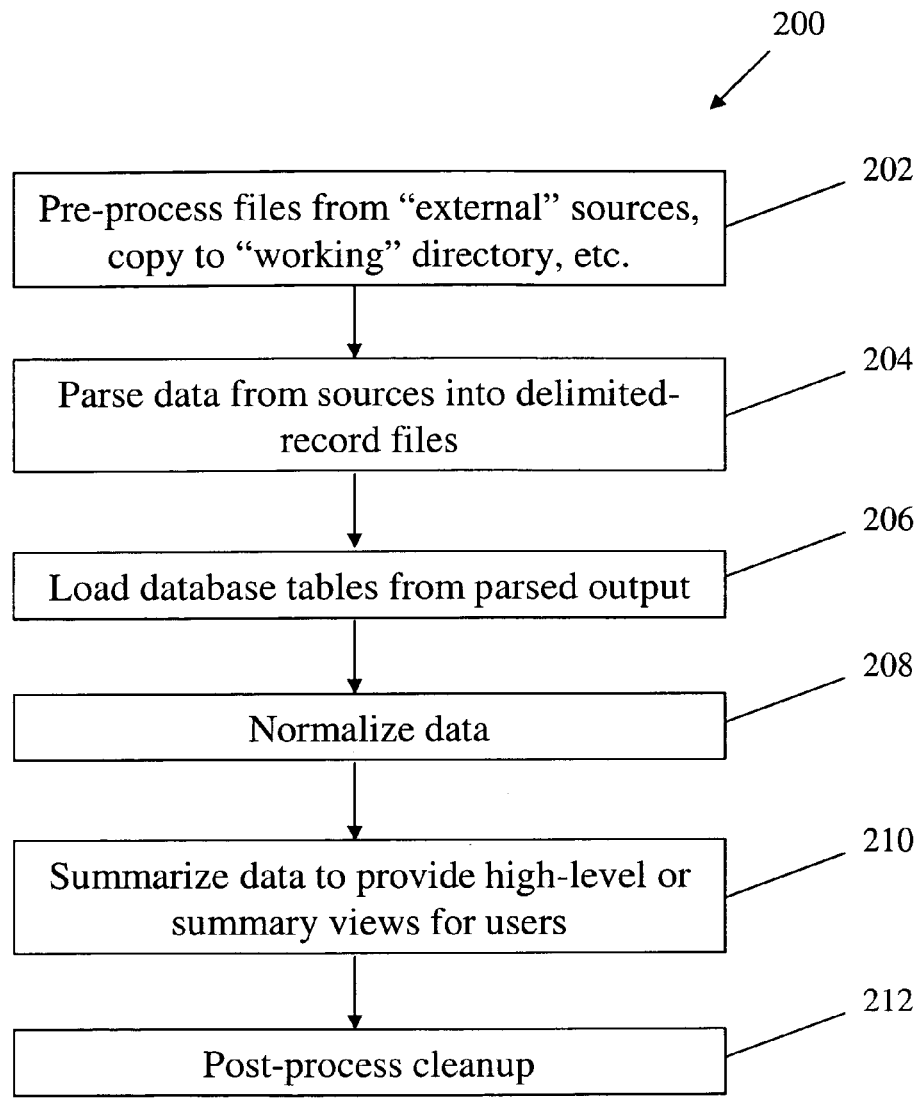
FIG. 2 displays a flowchart covering several aspects of the present invention.

FIG. 2 displays a flowchart 200 illustrating an exemplary configuration of the present invention. The exemplary flowchart 200 discusses various aspects of data management, such as retrieving data from various sources, parsing and loading data into a relational database, analyzing data and post-process file clean-up. The flowchart is applicable with respect to data management of a CMS of a broadband network, thereby enabling analysis of network parameters from raw data located throughout the network. Although the flowchart illustrates a particular sequence of aspects of data management, these aspects and their order of execution are configurable. A particular aspect can be performed by itself, or any particular aspect of grouping of aspects can be run several times in repetition, etc. A configurable grammar, such as an XML grammar using regular expressions, is executed which implements various aspects of the present invention. In general, each aspect of the invention (i.e. parsing, loading, summarizing, etc.) can be performed by calling a utility designed to perform the pertinent function. For example, SQL Loader is often used to load data into a relational database. The XML grammar calls the utility (i.e., the SQL Loader) and implements the utility to the specific configuration of the task. The utility is implemented dynamically, so that a different utility can be called to fit the needs of the software developer. For example, a Java class might be designed that performs the same functions as the SQL Loader. This Java class could then be implemented in place of the SQL Loader.

Box 202 represents a pre-processing stage in which files located at "external" sources are copied to a working directory. The pre-processing stage further comprises creating backups of files, decompressing compressed files, and extracting archived files. External sources generally refer to network elements, such as are shown in the broadband network of FIG. 1 (i.e. DSLAM 103, ATM Switch 104, router 106, etc.). The pre-processing stage handles differences in data formats and storage methods. For instance, data can be stored in various stages of compression and/or archiving. Different compression utilities (e.g. using *.Z, *.gz compression) can be used to compress files, and different archiving utilities (e.g. *.tar, *.zip, *.jar) can be used to archive files. Data can be generally stored in various formats (i.e., text, binary). Naming conventions differ. For example, while some file names may be alphabetically named, others may be named using date and time or some other designation. File formats are commonly different. The various files include delimited files, fixed-width files, XML files, report-formatted files, and "flat" text files, among others.

In the parsing stage of Box 204, pre-processed data are typically parsed into delimited record files, generally in preparation for loading into a relational database and/or for sharing of data with other "downstream" applications, such as database-ready loadable files (i.e. Oracle dat files), XML sharable files, and delimited text files, etc. The parsing stage further comprises data enhancement and data validation, data merging and correlation from various sources, etc., into a variety of output files. Relations that are used in relational databases can be established in between data elements at this stage. In one exemplary embodiment of the present invention, a generic parser module is provided that calls a CMS Parser Manager to perform parsing functions. The CMS Parser Manager handles any number of input files with multiple record formats and produces any number of output files, having multiple possible record formats. The XML grammar of the parser module calls the CMS Parser Manager and configures data using regular expressions so that the data can be processed by the CMS Parser Manager.

In the loading stage of Box 206, parsed data is loaded into one or more relational database tables. In an exemplary embodiment, a generic loading module calls SQL Loader in order to load data into an Oracle database. Alternatively, the operator can design their own Java-based JDBC application and call it to load the data. The loading aspect of the present invention manages destination tables as well as storage parameters. The present invention accommodates variable numbers of load files and variable number of locations of the load files, as well as variable number and names of database tables.

Once data has been loaded, application modules using XML grammar and regular expressions can be executed to perform any number of analysis functions, such as summarization or normalization of data. These application modules can call any number of normalization and summarization utilities. Summarization requirements, for example, vary based on the data elements, algorithms used, etc. In Box 208 data is normalized, and in Box 210, data is summarized to provide high-level views or summary views for users. In Box 212, a post-process cleanup occurs in which, for example, temporary files are deleted.

As an example implementing the present invention, one can consider determining a network condition by processing data located at 34 DSLAMs spread across several states in the network. For example, an Alcatel 7300 DSLAM, a commonly used DSLAM, operates an EMS (element management system) which provides configuration data for the DSLAM. Data relating to DSLAM operation can be pulled, for instance, from three data sources: the configuration data of the DSLAMs (1 file per DSLAM), performance data of the DSLAM (multiple files), and data from probes that collect performance data directly from each DSLAM. In a pre-processing stage, this data transfers to a landing server (landing zone) where the data is organized. As a result, data that is spread out over a large number of smaller files (i.e., 95 files). In a parsing stage, this data is reassembled into a smaller number of files (i.e., 2 files) of larger size. This is done using parsing functions provided by the Data Manager. Any cross-referencing, organizing, correlation, data merging, etc, can be performed during parsing. In a loading stage, data can be loaded into a relational database. Then an analysis of the network element (the DSLAM) can be made in a normalization and summarization stage. For example, an analysis can be made of the amount of traffic passing through a DSLAM, so as to check, for example, for bottlenecks in traffic. The entire process (i.e., pre-processing, parsing, loading, normalization, and summarization) is actualized using modules designed for the purpose and written in XML grammar using regular expressions.

Continuing with the example of a bottleneck in traffic, another XML grammar and regular expressions is executed to perform a deeper analysis of the data (for example, by checking time-of-day usage and channel usage) to determine whether the bottleneck is due, for instance, to a large amount of single users (i.e., peer-to-peer file sharing among students) or due to a single user (i.e., a company), and appropriate actions, such as load balancing or traffic routing in the network, can then be taken to reduce the bottleneck. Trends can also be analyzed to forecast necessary network reconfiguration, routing, and equipment upgrades to alleviate bottlenecks before network performance is affected.

The present invention provides a CMS Data Manager object class, various aspects of which (i.e. CMS Data Parser, CMS Data Loader) can be implemented at the appropriate stages of flowchart 200 (i.e. parser, loader, summarizer, etc.). In addition, the XML grammar enables the dynamic implementation of separately-designed utilities. For instance, a Java class that performs data analysis could be designed and implemented using the XML grammar. Equation (1) shows an example of implementing a module:

app.parser=sbc.cms.datamanager.AppParser       (1)

The right hand side of Eq. (1) specifies a utility (e.g., the CMS Parser Manager) and the left hand side specifies the module that implements the utility. Similarly, utilities can be implemented for loading data, summarizing data, post-processing data, etc. The stages shown in FIG. 2 and their order of execution are configurable. Also, any given stage can be run any number of times.

Figure 3:
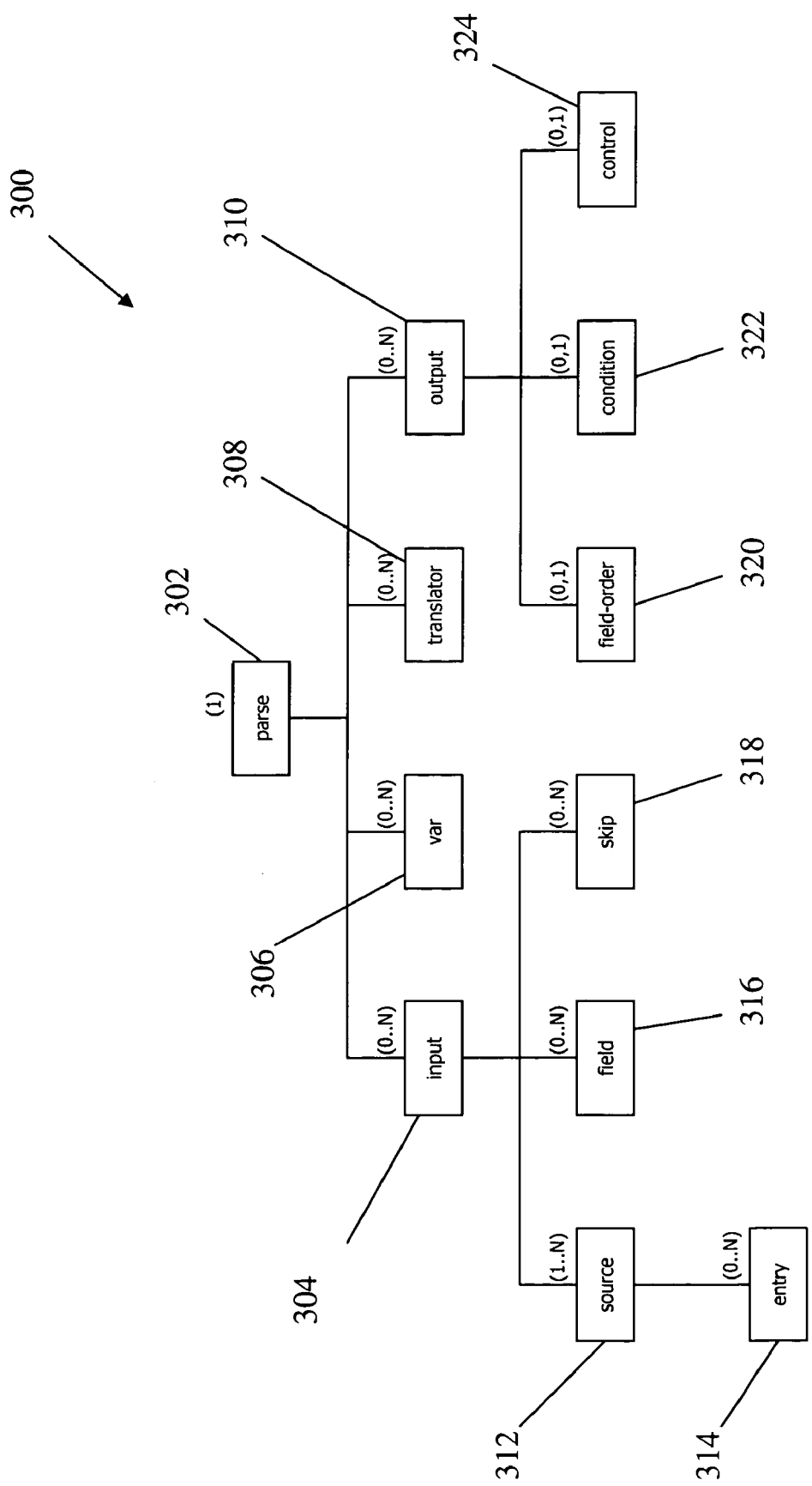
FIG. 3 illustrates an XML Instruction Element hierarchy.

FIG. 3 illustrates an XML Instruction Elemental hierarchy 300 for XML code implementing the Parser Manager of the present invention. Top-level instruction, <parse> 302 is a parent statement to <input> 304, <var> 306, <translator> 308, and <output> 310 statements. The <input> 304 statement is parent to the <source> 312, <field> 316, and <skip> 318 statements. The <output> 310 statement is parent to the <field-order> 320, <condition> 322, and <control> 324 statements. The <source> 312 statement is parent to the <entry> 314 statement.

The <input> 304 statement defines the sources to be read as input, including how many input lines constitute a logical record, the maximum number of records to read, what data to capture in fields, and which lines (or records) to skip. The <source> 312 statement defines the file names (including wildcard characters), file types (i.e. gzip, jar, tar, text, zip, etc.), and the action to take if the file is missing, such as aborting the program, ignoring the error, or setting a warning. The <source> statement also tracks the maximum number of records to read as well as how to dispose of a file after processing (i.e. delete or keep). Rejected records are contained in a specified file. The <source> statement is parent to the <entry> 314 statement, which defines the name of a file entry to be read from an archive file (i.e. jar, tar, zip, etc.).

The <field> 316 statement defines the area of the input record to capture and how to process the data. A <skip> 318 statement defines which records or lines of a multi-line record should be ignored and how many.

The <output> 310 statement defines actions and parameters concerning the output file, including the destination of the output file, output type, record limit, fields and variables to include and their output order, any value delimiters, and actions to take when a field is empty (i.e., abort, delete, ignore). The <output> 310 statement is a parent to <field-order> 320, <condition> 322, and <control> 324. The <field-order> statement aids in defining names of fields and/or variables to be included in each output record. The <condition> statement defines conditions that must be satisfied before a record can be output (i.e., relational operations, list operation, range operations, and pattern matching). The <control> statement defines parameters for creation of an SQL Loader control file, which is used in the loading stage.

The <var> 306 statement defines a variable to hold a constant, field, or variable value or concatenation of several values. References are generally enclosed in "curly" { } brackets. An example of a variable might be {_inputfilename_}, which represents the name of the current input file. A <translator> 308 statement defines a Java class to be used to manipulate values of fields/variables. The <translator> can perform a key-to-value "look-up" from a file or a database table, thereby enabling transforming values, etc. Standard translators include binary-to-decimal, octal-to-decimal, hex-to-decimal conversion, as well as decimal-to-binary, decimal-to-hex, and decimal-to-octal conversion. In another embodiment, a translator can replace state abbreviations (i.e. CA, OH, FL, etc.) with regional carriers that cover the area.

Figure 4:
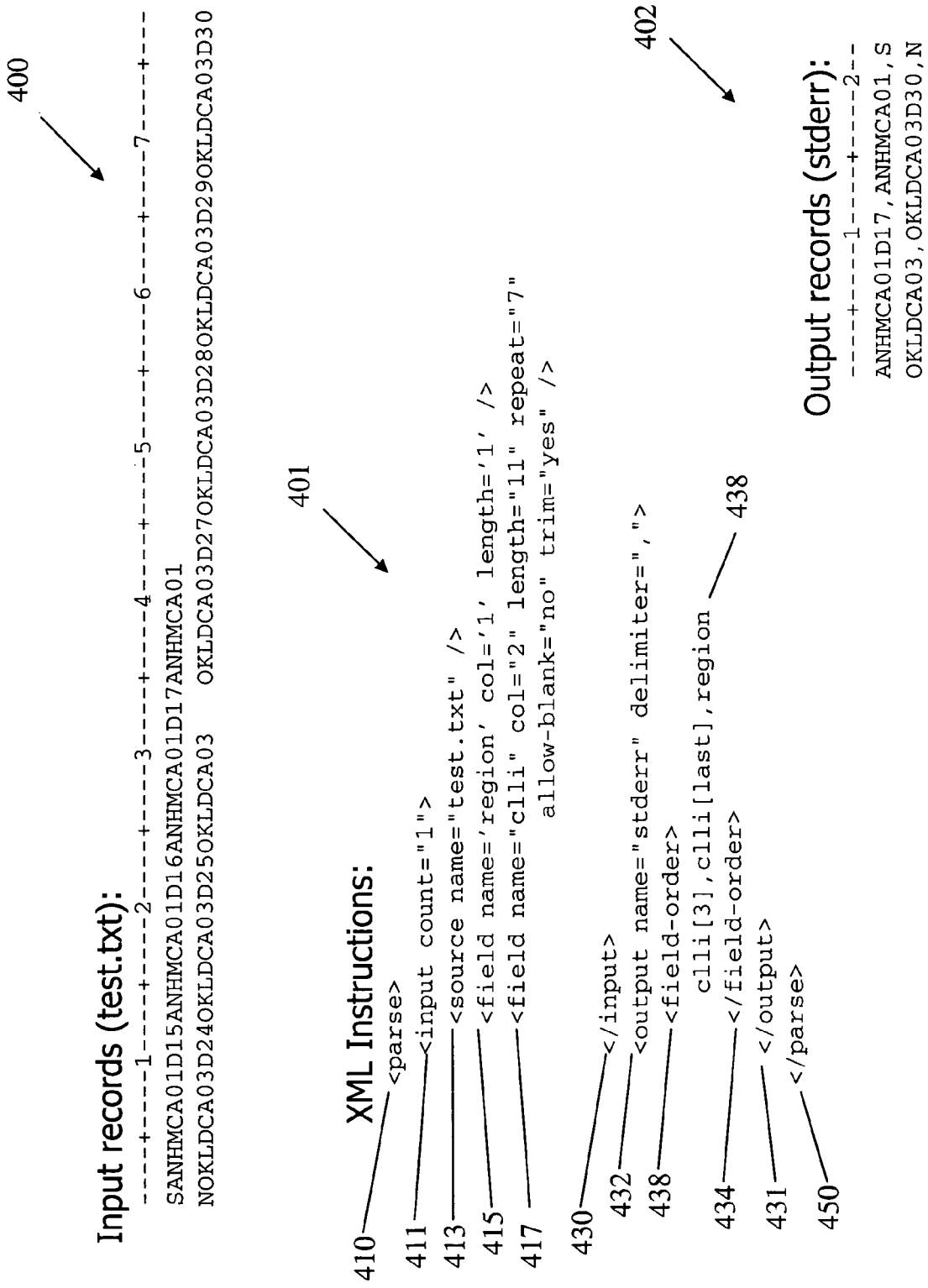
FIG. 4 illustrates an exemplary implementation of XML grammar related to parsing data.

FIG. 4 illustrates an exemplary XML implementation of parsing code. XML instructions are shown 401, with an input record 400 and an output record 402. <Parse> 410 statement signifies that parse statements follow. The </parse> statement 450 signifies the close of a set of parse statements. An <input> 411 statement and </input> 421 statement are located inside the parse statements 410 and 450, consistent with the hierarchical relation between <parse> and <input> shown in FIG. 3. The <output> 430 and </output> 431 statements are similarly located inside the parse statements 410 and 450. All other fields follow the same hierarchical structure outlined in FIG. 3.

The <input> 411 statement indicates the number of records to be read. The <source> statement 413 names the input file ("test.txt"). The <field> 415 statement creates a field (name='region') and enters data into the field by selecting, starting at column 1 (col='1'), a field that is one character long (length='1'). The <field> 417 statement creates a field (name="clli") and enters data into the field stating at column 2 (col="2") of the input file, selecting fields that are 11 characters long (length="11"), repeating the selection process seven times (repeat="7"), allowing for no blank entries (allow-blank="no"), and trimming data (trim="yes").

The <output> 430 statement creates an output record name (name="stderr") and a method of delimiting the data (delimiter=","). The order in which the fields are displayed is defined between <field-order> 432 and </field-order> 434. Thus, the third entry for the "clli" field, the last entry for the "clli" field and the 'region' field are displayed. The results of applying code 401 to input file 400 are shown in output record 502.

FIG. 5 illustrates exemplary XML code 500 used in a loading stage of the present invention. The <loader> statement calls the loading utility and several actions are used to implement the utility for the particular data to be loaded and the particular table into which data is to be loaded. Action 502 implements a creates a table ("LCNT_CSN_CPU_STATS"). Action 504 calls the SQL Loader. An operator skilled in the arts will notice that different loaders that are available can be implemented by rewriting this line accordingly. Action 506 (delete_after_load="no") provides instructions not to delete files after loading. Action 508 (file_type="dat") specifies the file type, and action 510 (method="append") specifies the method of entered data into the data table, in this case, by appending the table. Statement 512 (<field name="CSN_HOST">) and ensuing statements specify fields in the table created in statement 502, thus enabling proper entry of data into the data tables.

Figure 6:
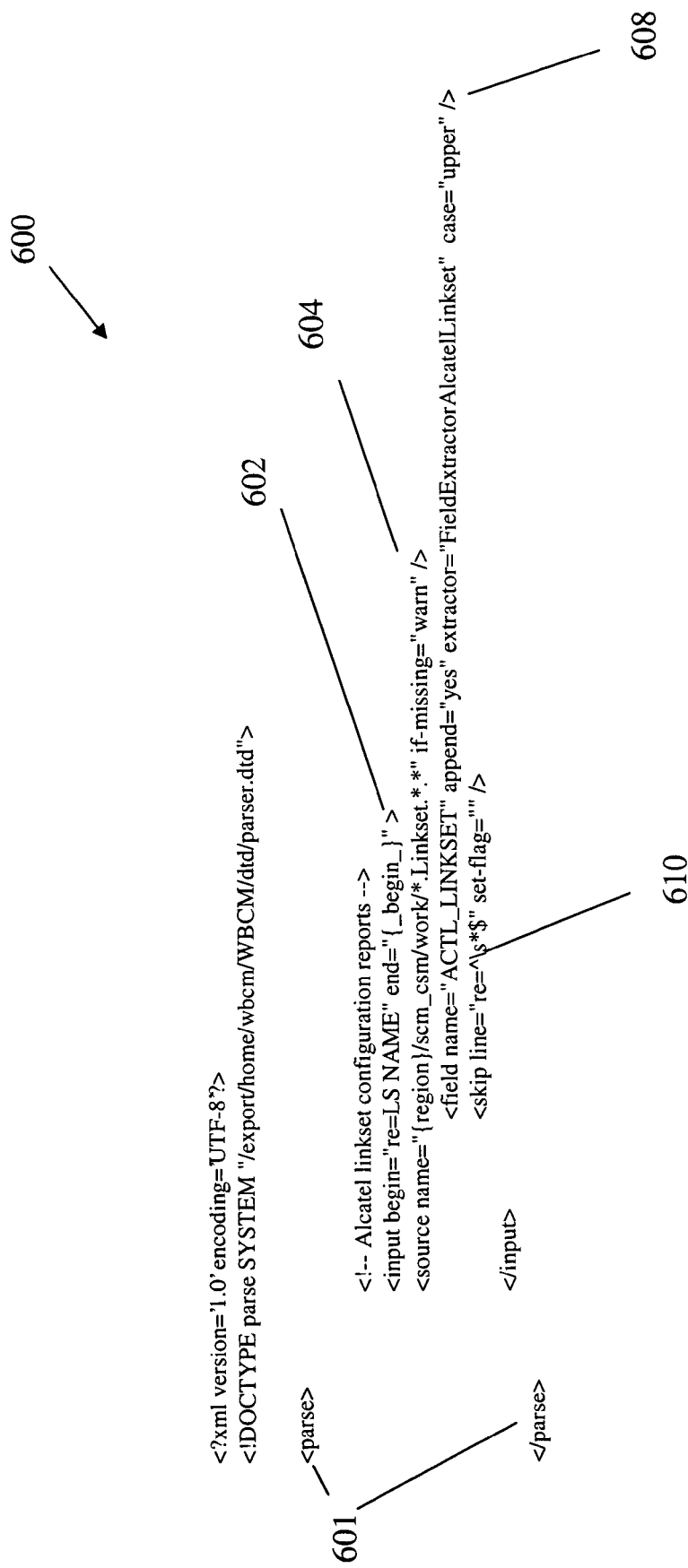
FIG. 6 illustrates the use of regular expressions within XML grammar.

FIG. 6 illustrates an exemplary XML grammar 600 using regular expressions to perform one aspect of the present invention. A parse command 601 is shown, further implementing input statement 602, source statement 604, field statement 608, and skip statement 610. Input statement 602 indicates a begin and end for determining input element boundaries. The "{_begin_}" is used when the input elements begin consistently with the same text, but the ending does not. The use of end="{_begin_}" indicates that the end of the input element can be determined upon finding the beginning of the next input element. The source statement 604 indicates the location of the data source ("{region}/scm_csm/work/*.Linkset.*.*") as well as an action to be taken if the data source is not found (if-missing="warm"). The field statement 608 indicates the name of the field into which data is to be entered (name="ACTL_LINKSET"), the method of data entry (append="yes") as well as other configuration details. The skip statement 610 indicates a sequence of characters to be searched for and skipped (not selected for entry into the field) if encountered. The skip statement uses a regular expression ("re=¯\s*$") to match a sequence of characters that are then operated on. The use of regular expressions enables a programmer to configure the module, (in the illustration of FIG. 6, a parser module) to various data sources.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. Accordingly, the invention is considered to include a tangible storage medium, as listed herein and including art-recognized equivalents, in which the software implementations herein are stored.

What is claimed is:

1. A computerized method for managing capacity for a communication network, comprising:
   receiving, by a capacity management system from a communication network element, traffic data indicative of network traffic, wherein the communication network element is selected from a digital subscriber loop access multiplexer and an asynchronous transfer mode switch providing an interface between an asynchronous transfer mode network and the capacity management system;
   pre-processing the traffic data to generate pre-processed data, wherein the pre-processing includes performing a pre-processing action selected from decompressing compressed data and extracting archived data, wherein the pre-processed data shares common compression and archiving characteristics;
   parsing the pre-processed data into delimited record files;
   loading the delimited record files into a database; analyzing the delimited record files in the database; and
   managing data traffic within the communication network based at least in part on the analyzing;
   wherein the parsing includes calling a parser manager by a generic parser module using an XML grammar to parse the pre-processed data using regular expressions.

2. The method of claim 1, further comprising load balancing the data traffic.

3. The method of claim 1, wherein the parsing further includes at least one of data enhancement, data validation, and data merging.

4. The method of claim 1, wherein the analyzing comprises determining a network condition and wherein the managing comprises configuring the communication network in response to the network condition.

5. The method of claim 4, wherein determining the network condition comprises forecasting the network condition.

6. A non-transitory computer readable medium containing program instructions that when executed by a computer perform a computerized method for managing capacity for a communication network, the program instructions comprising instructions for:
   receiving, from a communication network element, traffic data indicative of network traffic, wherein the communication network element is selected from a digital subscriber loop access multiplexer element and an asynchronous transfer mode switch element connected to an asynchronous transfer mode network;
   pre-processing the traffic data to generate pre-processed data, wherein the pre-processed data shares common compression and archiving characteristics;
   parsing the pre-processed data into delimited record files;
   loading the delimited record files into a database;
   analyzing the delimited record files in the database; and
   managing data traffic within the communication network based at least in part on a result of the analyzing;
   wherein the instructions for parsing include instructions for calling a parser manager by a generic parser module using an XML grammar and instructions for parsing the pre-processed data using regular expressions.

7. The medium of claim 6, wherein the program instructions include instructions for load balancing the data traffic.

8. The medium of claim 6, wherein the instructions for parsing include instructions for performing at least one of data enhancement, data validation, and data merging.

9. The medium of claim 6, wherein the program instructions include instructions for determining a network condition and wherein the instructions for managing include instructions for configuring the communication network based at least in part on the network condition.

10. The medium of claim 6, wherein the instructions for determining the network condition include instructions for forecasting the network condition.

11. A capacity management system for managing capacity of a communication network, the system including a processor having access to a tangible computer readable medium including processor executable program instructions, the program instructions comprising instructions for:
   receiving, from a communication element, traffic data indicative of network traffic, wherein the communication element comprises a digital subscriber loop access multiplexer;
   pre-processing the traffic data to generate pre-processed data, wherein the pre-processed data shares common compression and archiving characteristics;
   parsing the pre-processed data into delimited record files;
   loading the delimited record files into a database; and
   analyzing the delimited record files in the database to identify a data traffic bottleneck;
   wherein the instructions for parsing include instructions for calling a parser manager by a generic parser module using an XML grammar to parse the pre-processed data using regular expressions.

12. The method of claim 11, wherein the program instructions include instructions for load balancing data traffic in response to said identifying.

13. The method of claim 11, wherein the instructions for parsing include instructions for at least one of data enhancing, data validating, and data merging.

14. The method of claim 11, wherein the instructions for analyzing comprise instructions for determining a network condition and wherein the instructions for managing include instructions for configuring the communication network in response to the network condition.

15. The method of claim 14, wherein the instructions for determining the network condition include instructions for forecasting the network condition.

* * * * *